US011656914B2

(12) United States Patent
Zhang et al.

(10) Patent No.: US 11,656,914 B2
(45) Date of Patent: May 23, 2023

(54) ANTICIPATING FUTURE RESOURCE CONSUMPTION BASED ON USER SESSIONS (71) Applicant: VMware, Inc., Palo Alto, CA (US)

(72) Inventors: Yao Zhang, Beijing (CN); Olivier Alain Cremel, Los Altos, CA (US); Zhelong Pan, Cupertino, CA (US); Xunjia Lu, Los Altos, CA (US)

(73) Assignee: VMWARE, INC., Palo Alto, CA (US)

( * ) Notice: Subject to any disclaimer, the term of this patent is extended or adjusted under 35 U.S.C. 154(b) by 246 days.

(21) Appl. No.: 16/991,348

(22) Filed: Aug. 12, 2020

(65) Prior Publication Data
US 2020/0371845 A1 Nov. 26, 2020

Related U.S. Application Data (63) Continuation of application No. 16/168,099, filed on Oct. 23, 2018, now Pat. No. 10,768,996.

(51) Int. Cl.
G06F 9/50 (2006.01)
G06F 9/455 (2018.01)

(52) U.S. Cl.
CPC ........ G06F 9/5077 (2013.01); G06F 9/45558 (2013.01); G06F 2009/4557 (2013.01); G06F 2009/45591 (2013.01); G06F 2009/45595 (2013.01)

(58) Field of Classification Search
CPC .................................................... G06F 9/5077
See application file for complete search history.

(56) References Cited

U.S. PATENT DOCUMENTS 7,684,417 B2    3/2010   Imai et al.
2015/0347194 A1* 12/2015 Che ................. G06F 9/45558
                                                  718/1
2016/0021216 A1    1/2016   Ashworth et al.
2018/0337984 A1* 11/2018 Zhang ................. H04L 65/40

* cited by examiner

Primary Examiner — Charlie Sun
(74) Attorney, Agent, or Firm — Thomas Horstemeyer, LLP (57) ABSTRACT Disclosed are various approaches to anticipating future resource consumption based on user sessions. A message comprising a prediction of a future number of concurrent user sessions to be hosted by a virtual machine within a predefined future interval of time is received. It is then determined whether the future number of concurrent user sessions will cause the virtual machine to cross a predefined resource threshold during the predefined future interval of time. Then, a message is sent to a first hypervisor hosting the virtual machine to migrate the virtual machine to a second hypervisor.

20 Claims, 4 Drawing Sheets

ANTICIPATING FUTURE RESOURCE CONSUMPTION BASED ON USER SESSIONS

CROSS-REFERENCE TO RELATED APPLICATIONS

This application claims priority to, and the benefit of, co-pending U.S. patent application Ser. No. 16/168,099, entitled "ANTICIPATING FUTURE RESOURCE CONSUMPTION BASED ON USER SESSIONS" and filed on Oct. 23, 2018, which is incorporated by reference as if set forth herein in its entirety.

BACKGROUND

Computer virtualization relates to the creation of a virtualized version of a physical device, such as a server, a storage device, a central processing unit (CPU), a graphics processing unit (GPU), or other computing resources. For instance, a virtual machine (VM) is an emulation of a computer system and can be customized to include, for example, a predefined amount of random access memory (RAM), hard drive storage space, as well as other computing resources that emulate a physical machine. As virtual machines resemble physical computer architectures, virtual machines can provide the equivalent functionality of a physical computer. As such, virtual machines can be executed remotely, in a data center for example, to provide remote desktop computer sessions for employees of an enterprise. Many enterprises have now moved away from offering purely physical desktops for personnel, instead utilizing virtual machines that provide virtual desktop sessions using remote resources.

A remote desktop session host (RDSH) is a computer system configured to provide virtual desktops or remote applications to users through a remote desktop application. Examples of RDSH systems include MICROSOFT® TERMINAL SERVICES, MICROSOFT REMOTE DESKTOP SERVICES, and CITRIX XENAPP®. For example, an RDSH system may allow for multiple users to concurrently connect to the RDSH system using a remote desktop application and interact with a graphical desktop environment, such as the WINDOWS® desktop. Each user could use the graphical desktop environment to execute applications installed on the RDSH system and save files to or edit files stored on the RDSH system. The RDSH system can prevent users from accessing files stored by others using operating system and filesystem permissions. As another example, the RDSH system may allow for multiple users to execute published applications. Published applications are hosted by and executed by the RDSH system. However, the user interface for the published application is rendered in a window within the local desktop environment of the client device, allowing for remotely executed applications to appear to behave largely like local applications.

An RDSH system can be implemented using a VM. For example, a VM with a version of MICROSOFT WINDOWS SERVER® installed may be configured to host MICROSOFT REMOTE DESKTOP SERVICES. Depending on the number of users to be supported and the types of applications provided, multiple VMs may be used to provide an RDSH system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to predicting or anticipating demand for computer resources by VMs that offer RDSH services. Various organizations are moving away from providing and maintaining purely physical desktops for personnel and, instead, are moving towards providing virtual desktop environments for employees to utilize. Some virtualization products deliver comprehensive end-user computing (EUC) capabilities. These virtualization products depend on a hypervisor or a virtual machine monitor (VMM) capable of managing computing resources for virtual machines, such as hardware resources. Other virtualization products allow for users to execute published applications provided by the RDSH services from the users' devices. These implementations allow for users to access enterprise applications using any device, such as personal devices in a bring-your-own-device (BYOB) enterprise environment. The automated management of physical resources by the hypervisor or VMM can be critical to reduce the operational costs associated the VMs provisioned for offering RDSH services.

However, in many situations, the hypervisor or VMM is often unable to accurately predict the amount of resources that should be allocated to a VM that offers RDSH services. For example, the hypervisor or VMM may be able to track the amount of computing resources (e.g., number of processors or cores, amount of memory, number of network adapters, amount of disk storage, etc.) currently allocated to the VM offering RDSH services, as well as the amount of computing resources previously consumed during prior periods of time. However, the hypervisor or VMM may not have insight into the types of applications being executed by the guests that are hosted by the hypervisor or how those applications are being used. To more accurately predict the resource requirements a VM may have in the future, the type and number of user sessions associated with the VM may be used to help predict the future resource requirements for the VM.

Figure 1:
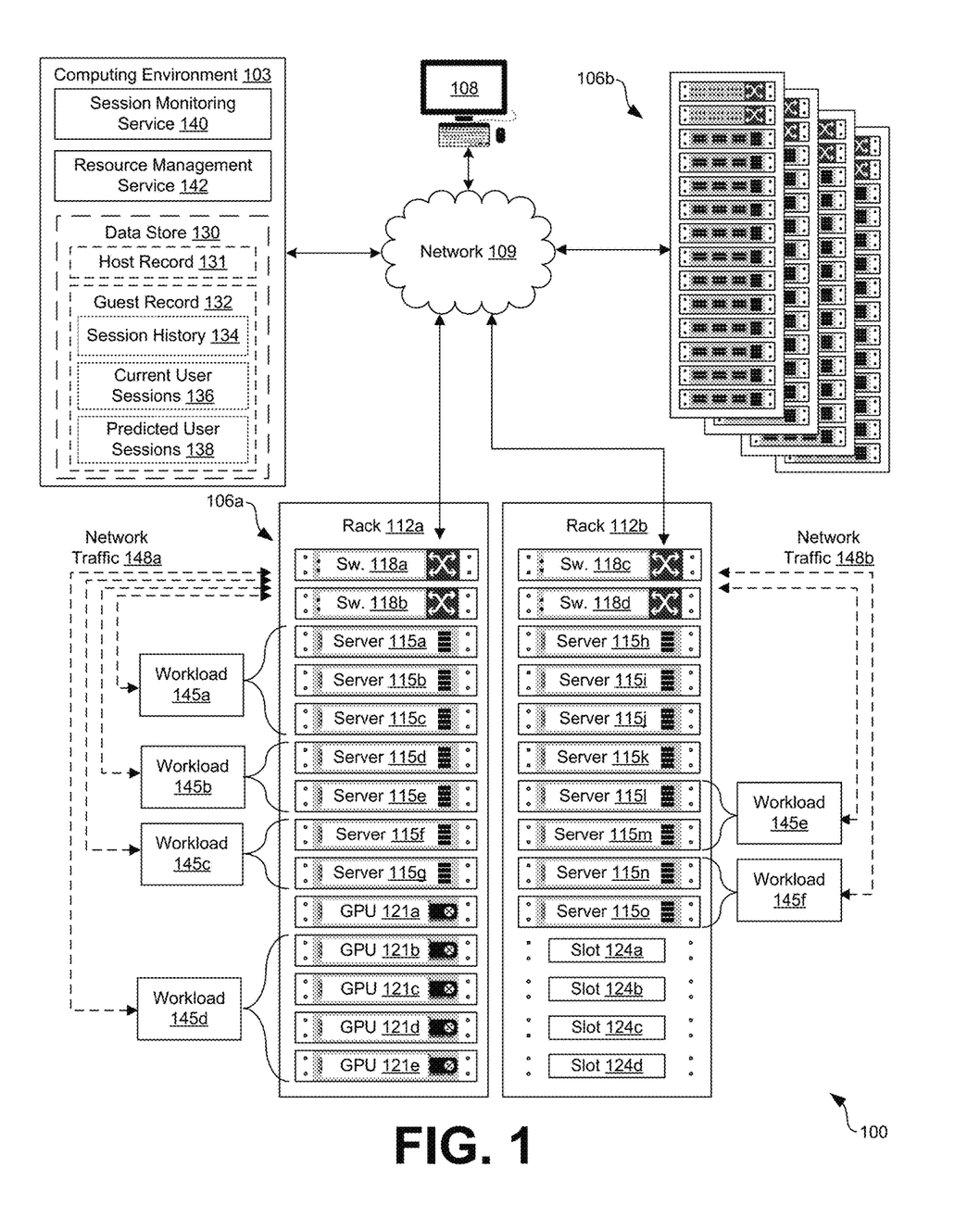
FIG. 1 is a drawing of an example of a virtualization environment having computing clusters capable of executing virtual machines.

With reference to FIG. 1, an example of a networked environment 100 is shown. The networked environment 100 can include a computing environment 103, various computing clusters 106a . . . 106b, and one or more client devices 108 in communication with one other over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

In various embodiments, the computing clusters 106 can include a plurality of devices installed in racks 112, which can make up a server bank, aggregate computing system, or a computer bank in a data center or other like facility. In some examples, the computing cluster can include a high-availability computing cluster. A high-availability computing cluster is a group of computing devices that act as a single system and provides a continuous uptime. The devices in the computing clusters 106 can include any number of physical machines, virtual machines, virtual appliances, and software, such as operating systems, drivers, hypervisors, scripts, and applications.

In some examples, the computing environment 103 can include an enterprise computing environment that includes hundreds or even thousands of physical machines, virtual machines, and other software implemented in devices stored in racks 112, distributed geographically and connected to one another through the network 109. It is understood that any virtual machine or virtual appliance is implemented using at least one physical device.

The devices in the racks 112 can include, for example, memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage a virtualization infrastructure. The physical hardware for a server 115 can include a CPU, graphics card (having one or more GPUs 121), data bus, memory, and other components. In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, if a server 115 includes an instance of a virtual machine, the server 115 can be referred to as a "host," while the virtual machine can be referred to as a "guest." Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include the VMware ESX™ hypervisor, the VMware ESXi™ hypervisor, or similar hypervisor. It is understood that the computing clusters 106 are scalable, meaning that the computing clusters 106 in the networked environment 100 can be scaled dynamically to include additional servers 115, switches 118, GPUs 121, power sources, and other components, without degrading performance of the virtualization environment. In some examples, the hosts in the computing cluster 106 are monitored and, in the event of a failure, the virtual machines or virtual appliances on a failed host are restarted on alternate hosts.

In various examples, when a host (e.g., a physical server) is added to a computing cluster 106, an agent application can be uploaded to the host and configured to communicate with other agent applications in the computing cluster 106. Some of the hosts in the computing cluster 106 can be designated as primary hosts, and other hosts in the computing cluster 106 can be designated as secondary hosts. The primary hosts, for example, can maintain and replicate states of the computing cluster 106 and can be used to initiate failover actions. Any host that joins the computing cluster 106 can communicate with a host, such as an existing primary host, to complete its configuration.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing clusters 106, it is understood that in some examples the computing clusters 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices 108 for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster in the computing clusters 106.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, object-oriented databases, hierarchical databases, hash tables or similar key-value data stores, as well as other data storage applications or data structures. The data stored in the data store 130, for example, can be associated with the operation of the various services or functional entities described below. For example, various host records 131 and guest records 132 can be stored in the data store 130.

A host record 131 can represent information related to a server 115 used as a host for a VM. For example, the host record 131 can include information such as the amount of memory installed on the server 115, the number and type of processors installed on the server 115, the number and type of GPUs 121 installed on the server 115, the number and type of network connections installed on the server 115, and various other data. The host record 131 can also include information related to the guest VMs currently hosted on the server 115. For example, the host record 131 could include a record of the number of guest VMs hosted on the server 115. As another example, the host record 131 could include a record of the amount and type of computer resources currently allocated to each of the guest VMs. These records could include the number of processor cores, amount of memory, amount of storage, number of GPUs 121, and the number of network connections. Likewise, the host record 131 could include the amount of allocated computer resources consumed by each of the guest VMs. For example, the host record 131 could include an indication that one guest VM is consuming 75% of the memory allocated to it and is using 47% of the processor resources allocated to it, while another guest VM is consuming 15% of the memory allocated to it and is using 97% of the processor resources allocated to it.

A guest record 132 can represent information related to a VM executing as a guest hosted by a server 115. For example, this information can include the version and type of operating system installed on the VM. A guest record can also include the number and type of applications installed on the VM. In some implementations, the guest record 132 could also include a record of the amount and type of computer resources currently allocated to the VM. For example, the guest record 132 could include the number of processor cores, amount of memory, amount of storage, number of GPUs 121, and the number of network connections assigned to the VM. Likewise, the guest record 132 could include the amount of allocated computer resources consumed by the VM. For example, the guest record 132 could include an indication that the VM is consuming 75% of the memory allocated to it and is using 47% of the processor resources allocated to it. In some implementations, this information may be recorded in the guest record 132 on a historical basis. In order to track and predict the amount of resources that a VM is likely to consume, the guest record 132 may also store a session history 134, a record of current user sessions 136, as well as information related to predicted user sessions 138.

The session history 134 can represent the collected historical data for user sessions hosted by RDSH services provided by a VM. For example, the session history 134 can include the number of user sessions hosted by an RDSH service provided by a VM at various points in time. The session history 134 can also include the amount of computing resources consumed by each of the user sessions (e.g., amount of memory, number of processor cycles or percentage of available processor time, amount of network bandwidth, or other resources).

The current user sessions 136 can represent the number of user sessions currently hosted by an RDSH service provided by a VM. In some implementations, the amount of amount of computing resources consumed by each of the current user sessions 136 may also be included.

The predicted user sessions 138 can represent a prediction of a future number of concurrent user sessions at a given point of time in the future or within a given interval of time in the future. In some implementations, the predicted user sessions 138 may also include a prediction of computer resource usage, such as a prediction that a user session in the future will consume a certain amount of memory, processor cycles, network bandwidth, or other amount of resources. For example, the predicted user sessions 138 could represent a prediction of the number of user sessions hosted by an RDSH service at a given point in time in the future (e.g., 11:08 on a Wednesday morning) or within a given period of time in the future (e.g., the next 15 minutes, the next 30 minutes, next hour, next 8 hours, next day, next week, etc.). In some embodiments, the predicted user sessions 138 may represent an average of the number of user sessions for the specified time or period of time, as recorded in the session history 134. In other implementations, the predicted user sessions 138 may represented a weighted average, with more weight provided to the more recently recorded numbers of user sessions in the session history 134. Other approaches for calculating the predicted user sessions 138 may also be used as appropriate for particular implementations.

Various applications can be executed on the computing environment 103. For example, a session monitoring service 140 and a resource management service 142 can be executed by the computing environment 103. Other applications, services, processes, systems, engines, or functionality not discussed in detail herein may also be executed or implemented by the computing environment 103.

Further, various physical and virtual components of the computing clusters 106 can process workloads 145a . . . 145f. Workloads 145 can refer to the amount of processing that a server 115, switch 118, GPU 121, or other physical or virtual component has been instructed to process or route at a given time. The workloads 145 can be associated with virtual machines or other software executing on the servers 115. For instance, the workloads 145 can include one or more groups of VMs providing RDSH services, such as remote desktops or published applications to client devices 108.

The session monitoring service 140 can be executed to monitor the number of user sessions currently being processed by individual VMs within a workload 145. For example, a VM implementing an RDSH service may report to the session monitoring service 140 at periodic intervals the number users currently logged into the VM or, similarly, the number of user sessions currently hosted by the RDSH service. In some implementations, the VM implementing the RDSH service may also report information about the user session, such as the amount of computing resources (e.g., processor time, memory, and bandwidth) consumed by each user session. Likewise, the VM implementing the RDSH service may also report information such as the process identifier or process name of each process executing within the user session and the amount of computing resources assigned to each process. This information can be reported by the RDSH service itself or by a reporting agent installed on the VM that collects this information and reports is to the session monitoring service 140.

The resource management service 142 can be executed to allocate workloads 145 to one or more servers 115 based on various factors. For example, the resource management service 142 may add an extra server 115 to the set of servers 115 assigned to a workload 145 in response to an increase in demand for computing resources. As another example, the resource management service 142 may reassign VMs within a workload 145 from one server 115 to another server 115 in order to more effectively use the servers 115 assigned to the workload 145. Similarly, the resource management service 142 can also remove servers 115 from a workload 145 and cause the removed servers 115 to be powered off or enter a low-power consumption mode of operation (e.g., standby or sleep modes). For instance, the resource management service 142 could determine that a workload 145 being processed by five servers 115 is only consuming the resources of an equivalent of two servers 115. Accordingly, the resource management service 142 could remove three servers 115 from the workload 145, cause the VMs in the workload 145 executing on the removed servers 115 to migrate to the remaining two servers 115 assigned to the workload 145, and send instructions to the removed servers 115 to power off or enter a low-power mode of operation.

Figure 2:
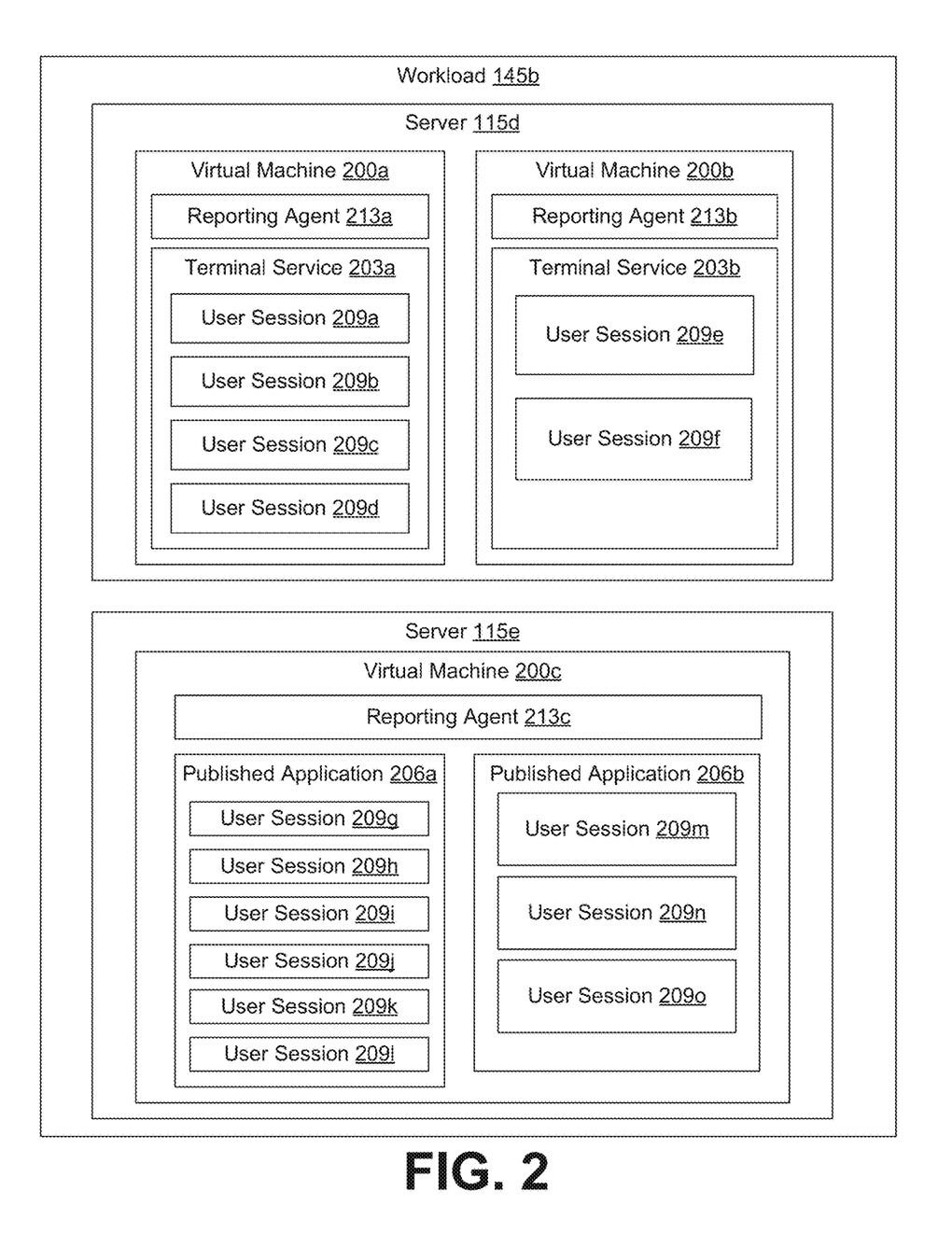
FIG. 2 is a drawing illustrating an example arrangement of RDSH services provided by VMs assigned to a workload in the virtualization environment depicted in FIG. 1.

Proceeding to FIG. 2, shown is an illustration of an example distribution of a workload 145. As illustrated, the workload 145b is spread across two servers 115, server 115d and server 115e. In this example, two virtual machines 200a and 200b are assigned as guests of the host server 115d, while a third virtual machine 200c is assigned as a guest of the host server 115e. These assignments may have been allocated by the resource management service 142 in order to make the most efficient use of available computing resources provided by the servers 115d and 115e. For example, the resource management service 142 may have assigned the virtual machine 200c to its own host, server 115e, upon determining that neither server 115d nor server 115d had sufficient available computing resources to execute virtual machine 200c alongside another virtual machine. Likewise, the resource management service 142 may have assigned virtual machines 200a and 200b to server 115d in response to a determination that server 115d had sufficient computing resources to host both virtual machines 200a and 200b without any performance impact.

As illustrated in FIG. 2, each virtual machine 200 can implement RDSH services, such as a terminal service 203 or a published application 206. As illustrated, virtual machine 200a and virtual machine 200b provide terminal services 203a and 203b, respectively. Likewise, virtual machine 200c provides published application 206a and published application 206b.

The terminal services 203a and 203b provide a graphical desktop environment hosted by virtual machines 200a and 200b, respectively. The graphical desktop environment can be rendered on a display of the client device 108 using a remote desktop application and user inputs can be sent from the client device 108 to the terminal service 203a or 203b. The graphical desktop environment can be used to execute applications installed on the virtual machines 200a and 200b. Likewise, the graphical desktop environment can be used to create or modify a user's files that are stored on or accessible from the respective virtual machine 200a or 200b.

The published applications 206a and 206b are applications that are locally hosted and executed by the virtual machine 200c, but have their user interface streamed to a client device 108 using a remote desktop application installed on the client device. The user interface for the published application is rendered in a window within the local desktop environment of the client device 108, making the published applications 206a and 206b appear to behave like local applications executed on the client device 108.

Each terminal service 203a or 203b can have zero or more user sessions 209 associated with it. Likewise, each published application 206a or 206b may have zero or more user sessions 209 associated with it. A user session 209 can represent the collection of processes executing under the user identifier of a remote user logged into a virtual machine, such as the virtual machine 200a, virtual machine 200b, or virtual machine 200c. For example, the user session 209a for a remote user logged into the terminal service 203a may represent the collection of processes required to provide a remote user with an instance of a graphical desktop environment, including any applications that the user may execute using the graphical desktop environment. As another example, the user session 209g for a remote user executing the published application 206a may represent one or more related processes executed under the user identifier of the remote user to in order to execute an instance of the published application 206a on behalf of the remote user.

In addition, each virtual machine 200 may also have a reporting agent 213 installed. As illustrated, virtual machines 200a, 200b, and 200c each have an instance of a reporting agent 213a, 213b, and 213c installed.

The reporting agent 213 can be executed to monitor the number of concurrent user sessions 209 processed by a virtual machine 200 over time. For example, the reporting agent 213 may monitor and record the number concurrent user sessions 209 processed by a virtual machine at various points in time. For instances, the reporting agent 213 could record the number of user sessions on a near continuous basis (e.g., the number of active user sessions 209 processed by a virtual machine 200 each second) or at other periodic intervals. The reporting agent 213 may report this information to the session monitoring service 140 at periodic intervals.

In some implementations, the reporting agent 213 may also monitor and record the resources consumed by individual user sessions 209, the types of applications executed within the context of a user session 209, and potentially other session data. For example, the reporting agent 213a might report the amount of memory allocated by the terminal service 203a to each of user sessions 209a, 209b, 209c, and 209d as well as the percentage of processor resources and the amount of network bandwidth consumed by each of user sessions 209a, 209b, 209c, and 209d. Likewise, the reporting agent 213c might report similar information for each instance of the published application 206b executed in the context of user sessions 209m, 209n, and 209o.

Next, a general description of the operation of the various components of the servers 115 of FIG. 1 and FIG. 2 within the network environment of FIG. 1 is provided. More detailed description of the operation of specific components is provided in the following flowcharts of FIGS. 3 and 4.

A workload 145, such as workload 145b, may include a number of virtual machines 200, such as virtual machines 200a, 200b, and 200c. The workload 145b may also be spread across a number of servers 115, such as servers 115d and 115e. The virtual machines 200 may in turn be assigned to servers 115d and 115e by the resource management service 142. For example, the resource management service 142 may assign the virtual machines 200a and 200b to the server 115d and the virtual machine 200c to the server 115e in order to efficiently and effectively spread the workload 145b across the available servers at that particular point in time. Users may access the RDSH services provided by the virtual machines 200a, 200b, and 200c.

For example, some employees in an enterprise environment may login to a terminal service 203 in order to access a graphical desktop environment in order to execute applications, create, edit, and save files, and perform other tasks as part of their employment. Accordingly, the employees may login to a terminal service 203, with each logged in user creating an instance of a user session 209 for the terminal service 203. For example, a first user may login to terminal service 203a, causing user session 209a to be created by the terminal service 203a. Another user might login to terminal service 203b (e.g., as a result of load balancing between virtual machines 200a and 200b), causing user session 209e to be created by the terminal service 203b.

Likewise, other employees in an enterprise environment may use dedicated computers (e.g., laptops or desktops), but need to access specific applications as part of their duties. These users might open a connection to an instance of a published application 206 or even use several published applications 206 at once. Each instance of a user executing a published application 206 will cause a user session 209 to be created. For example, one user executing published application 206a will cause the virtual machine 200c to create a first user session 209g associated with the published application 206a. A second user executing published application 206b will cause the virtual machine 200c to create a second user session 209m associated with the published application 206b. A third user executing multiple published applications 206 concurrently, such as published application 206a and published application 206b, will cause the virtual machine 200c to create user sessions 209h and 209n for the third user, with each user session 209 representing an instance of the user executing published application 206a or 206b.

As users login to the terminal services 203a and 203b or use published applications 206a and 206b, reporting agents 213 monitor the user session 209 activity. For example, the reporting agent 213a may monitor and periodically report the number of user sessions 209 logged into terminal service 203a at various intervals to a session monitoring server 140. For example, the reporting agent 213a may report every minute (or every five minutes, 10 minutes, etc.) the current number of users sessions 209 hosted by the terminal service 203a on the virtual machine 200a. As another example, the reporting agent 213a could record the current number of user sessions 209 hosted by the terminal service 203a at predefined periodic intervals, but report the recorded numbers of user sessions 209 in periodic batches. For example, the reporting agent 213a could identify and record the current number of user sessions 209 every minute, but report the collected statistics every 30 minutes or every hour to the session monitoring service 140.

In some implementations, the reporting agent 213 may also collect information about the amount of computing resources consumed by individual ones of the user sessions 209. For example, the reporting agent 213a could identify the amount of memory consumed by or allocated each of user sessions 209a, 209b, 209c, and 209d. The reporting agent 213a might also identify which applications are being executed by individual user sessions 209, as well as how much of the memory consumed by each user session 209 is consumed by each application executed by the user session 209. Similar statistics could be recorded for other types of computing resources, such as processor cores or processor cycles, network bandwidth, GPU cycles, or other types of computing resources.

The session monitoring service 140 can then receive the report from the reporting agent 213 and store the statistics included in the reports in the session history 134 for the guest record 132 corresponding to the virtual machine 200 executing the reporting agent 213. The session monitoring service 140 may also identify the current number of user sessions 209 hosted by the virtual machine 200 from the report and store that number as the current user sessions 136 for the guest record 136. In those implementations where the reporting agent 213 provides resource consumption data for the user sessions 209, the resource consumption data can also be stored in the session history 134 and the current user sessions 136.

As the session monitoring service 140 updates the session history 134, the session monitoring service may also update the predicted user sessions 138 to incorporate the latest data. For example, the session monitoring service 140 may recalculate the average number of user sessions 209 hosted by the virtual machine 200 for a given time or period of time (e.g., at business open, business close, 10:43 on a Tuesday morning, for the next 15 minutes, next 30 minutes, next hour, next 8 hours, etc.) and store that information as updated predicted user sessions 138. Likewise, the session monitoring service 140 can also recalculate the anticipated future computing resource usage for the predicted user sessions 138 in some implementations.

In an example implementation, the session monitoring service 140 could operate in two phases. First, the session monitoring service 140 could perform a training phase, where session history 134 is used to generate a prediction model. The prediction model could be generated using various statistical models or learning models like (ARIMA) (TES) (GBDT) or a random forest. Then, the session monitoring service 140 could receive current data regarding user sessions 209 from the reporting agent 213. The session monitoring service 140 could then use the session history 134 and the current user sessions 209 as the input sample to the prediction model, to predict the future user sessions 209 hosted by the virtual machine 200.

Figure 3:
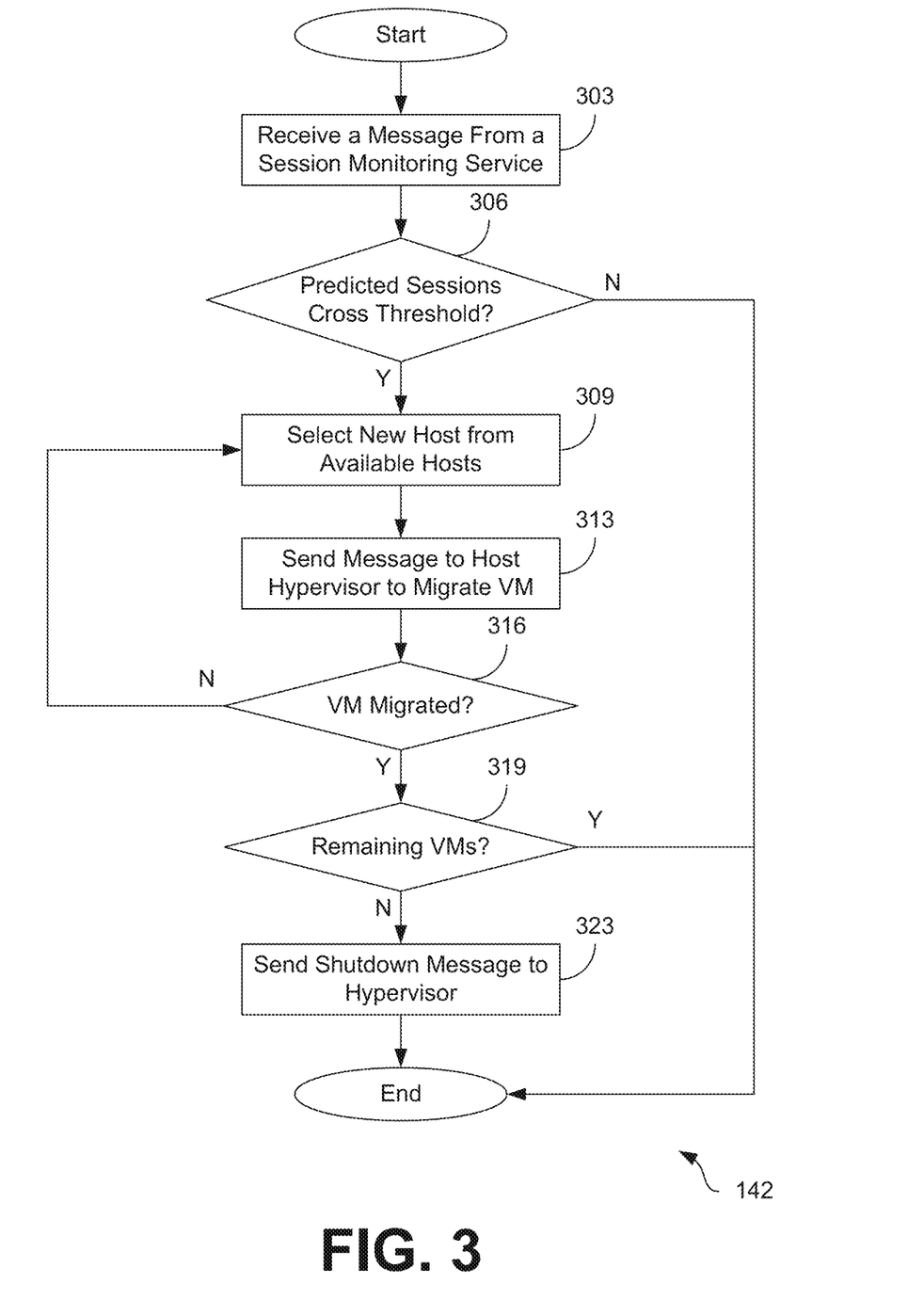
FIG. 3 and FIG. 4 are flowcharts representing the implementation of functionality provided by components of the virtualization environment depicted in FIG. 1.

Moving on to FIG. 3, shown is a flowchart that provides one example of the operation of a portion of the networked environment 100. The flowchart of FIG. 3 can be viewed as depicting an example of elements of a method implemented by the resource management service 142 or by the resource management service 142 executing in the computing environment 103 according to one or more examples. The separation or segmentation of functionality as discussed herein is presented for illustrative purposes only.

Beginning at step 303, the resource management service 142 can receive a message that contains the predicted user sessions 138 that will be processed by an RDSH service hosted by a virtual machine 200. In some instances, the predicted user sessions 138 will be provided for a predefined future interval of time (e.g., the next 5 minutes, 15 minutes, 30 minutes, hour, etc.) In some implementations, the resource management service 142 may receive the message from the session monitoring service 140.

In some implementations, the message may also contain additional information about the predicted user sessions 138. For example, the message may include an indication of the type of predicted user sessions 138 (e.g., a user session 209 for a terminal service 203 versus a user session 209 for a published application 206). In some instances, the message may also include additional information related to the amount of resource that the predicted user sessions 138 are anticipated to use. For example, the message may include an indication of the amount of memory, network bandwidth, or processor usage that the predicted user sessions 138 are likely to require based on an analysis of historic usage data performed by the session monitoring service 140. For instance, some published applications 206 may require significant amounts of memory, but minimal amounts of processor time, while other published applications 206 may require moderate amounts of memory, but significant amounts of processor time. As an example, the predicted user sessions 138 associated with published application 206a may be different from the resource expectations for the predicted user sessions 138 associated with published application 206b.

Moving on to step 306, the resource management service 142 determines whether the resources associated with the predicted user sessions 138 will cause the virtual machine 200 hosting the RDSH service (e.g., a terminal service 203 or a published application 206) to cross a predefined resource threshold during the predefined future interval of time. The predefined resource threshold may have been previously set as a value in policy, setting, or configuration file to a value appropriate for the particular needs of the particular implementation. The determination can also be based on a variety of factors.

For example, the resource management service 142 could determine that the amount of resources necessary to handle the predicted user sessions 138 exceeds a maximum amount of available resources assignable to the virtual machine 200. For instance, the resource management service 142 could determine that the average amount of memory required per predicted user session 138 multiplied by the number of predicted user sessions 138 is greater than the amount of memory available on the current host server 115 to assign to the virtual machine 200. Likewise, the resource management service 142 could make a similar determination regarding processor usage, network bandwidth, or other types of computing resources.

As another example, the resource management service 142 could determine that the amount of resources required to handle the predicted user sessions 138 is less than an amount of available resources on another server 115. For example, the resource management service 142 could determine that the predicted amount of resources necessary to process the user sessions 209 associated with published application 206a and published application 206b hosted by virtual machine 200c is less than the amount of remaining resources available on server 115 to assign to a virtual machine 200. This scenario would indicate that the virtual machines 200a, 200b, and 200c could be consolidated on server 115d, allowing server 115e to be powered down or otherwise enter a standby mode.

Assuming that the resource management service 142 determines that the threshold will be crossed, then the resource management service 142 selects a new host server 115 from the available servers 115 assigned to the workload 145 at step 309. The new host server 115 may be selected according to various criteria. For example, the new host server 115 may be selected based on whether it has sufficient available computing resources to assign to the virtual machine 200 hosting the RDSH service. Where multiple potential new host servers 115 are available, the one with the largest amount of available computing resources may be preferentially selected. As another example, a host server 115 that has already been assigned to the workload 145 may be preferentially selected in order to avoid the extra overhead incurred in assigning a new server 115 to the workload 145.

In some situations, there may not be a server 115 with sufficient available computing resources for the predicted user sessions 138 that the virtual machine 200 is anticipated to process. In these situations, the resource management service 142 may select a server 115 that is unassigned to any workloads 145 (e.g., a server 115 that has been powered-off or is currently in standby or similar low-power mode of operation). The resource management service 142 would then add the unassigned server 115 to the workload 145 and send any required messages or instructions to the server 115 to configure the server 115 to host the virtual machine 200.

Proceeding to step 313, the resource management service 142 sends a message to the hypervisor executing on the current host server 115 of the virtual machine 200 to migrate execution of the virtual machine 200 to the server 115 selected at step 309. In some instances, the message may instruct the hypervisor executing on the current host server 115 to begin a live migration of the virtual machine 200. In other instances, the message may instruct the hypervisor to suspend execution of the virtual machine 200, so that the state of the virtual machine 200 may be transferred to a hypervisor on the server 115 selected at step 309. Once the state has been transferred, execution of the virtual machine 200 could be resumed on the new host server 115.

However, in some situations, the amount of computing resources necessary to process the predicted user sessions 138 may be greater than the amount of computing resources available to any server 115. For example, the average amount of memory required per predicted user session 138 multiplied by the number of predicted user sessions 138 may be greater than the amount of memory installed in any server 115. In these situations, the resource management service 142 may select one or more servers 115 as previously described to process a portion of the predicted user sessions 138. In these instances, the resource management would clone the virtual machine 200 and cause the clone(s) to begin execution on the newly selected server 115. Various load balancers could be used to be distributed the predicted user sessions 138 between the virtual machine 200 and its clones.

At step 316, the resource management service 142 confirms that the virtual machine 200 has successfully migrated to the new host server 115. Migration might fail, for example, if there were a sudden and unexpected spike in the usage of computing resources available to the new host server 115. If migration of the virtual machine 200 fails, then the process loops back to step 309 and another server 115 is selected.

Assuming that migration of the virtual machine 200 is successful, then the resource management service 142 checks to see if there are any remaining virtual machines 200 executing on the original host server 115 at step 319. For example, the resource management service 142 could send a message to the hypervisor executing on the original host server 115 to request the number of virtual machines 200 currently executing on the server 115.

If there are no remaining virtual machines 200 hosted by the hypervisor of the original server 115, then the resource management service 142 may send a shutdown message to the original server 115 to cause the original server 115 to power down or otherwise enter a standby or similar power saving mode of operation.

Figure 4:
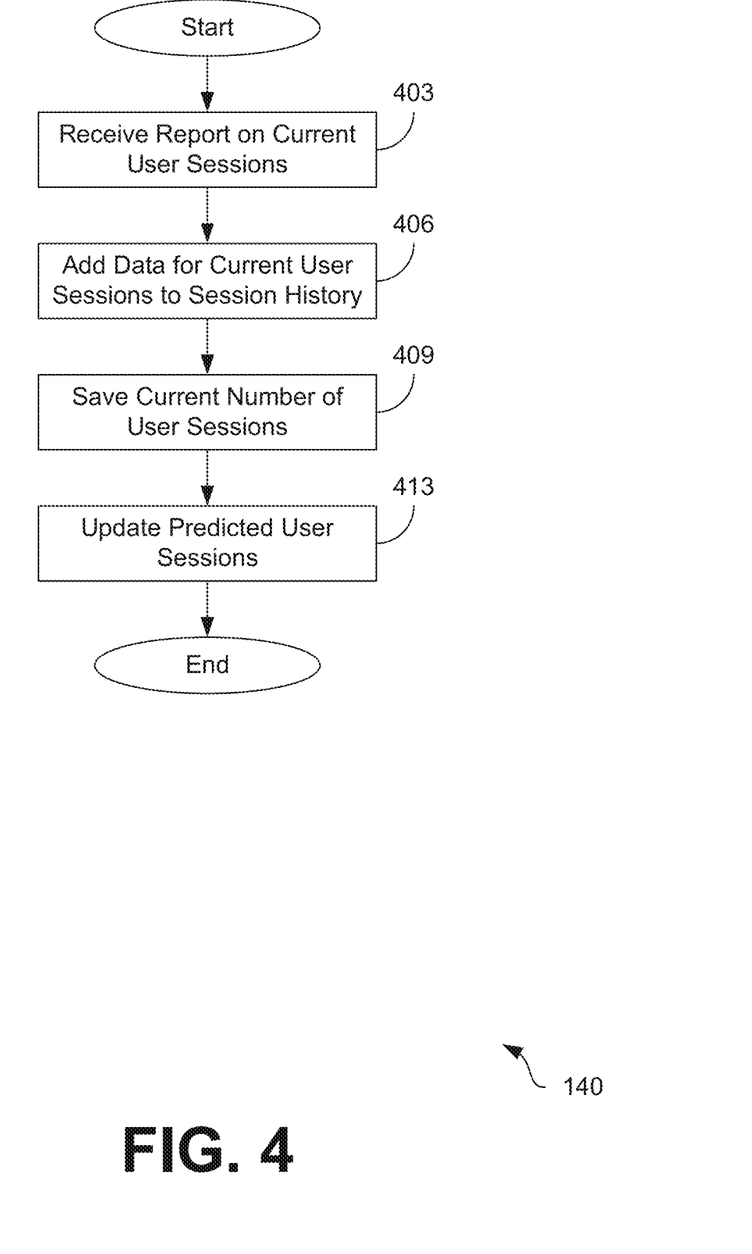

Moving on to FIG. 4, shown is a flowchart that provides one example of the operation of a portion of the networked environment 100. The flowchart of FIG. 4 can be viewed as depicting an example of elements of a method implemented by the session monitoring service 140 or the session monitoring service 140 executing in the computing environment 103 according to one or more examples. The separation or segmentation of functionality as discussed herein is presented for illustrative purposes only.

Beginning at step 403, the session monitoring service 140 receives a message from a reporting agent 213 executing on a virtual machine 200 regarding the current user sessions 136 being processed by the virtual machine 200. The message can include the current number of user sessions 209 being processed by the virtual machine 200. The message can also include information about the resources consumed by each of the user sessions 209, such as the amount of memory allocated to each user session, the amount of processor resources consumed by applications or processes executed within the context of the user session 209, the amount of bandwidth consumed by the user session 209, as well as any other desired data. The message may also include a timestamp indicating the date and time at which the reporting agent 213 sent the message or the reporting agent 213 compiled the data regarding the user sessions 209.

Next, at step 406, the session monitoring service 140 updates the session history 134 stored in the guest record 132 associated with the virtual machine 200 to reflect the current user sessions 136. At step 409, the session monitoring service 140 may also save the current user sessions 136 to the guest record 132 for the virtual machine 200. This may be done to allow various applications, such as the resource management service 142 or other services or processes, to retrieve the current state of the user sessions 209 being processed by the virtual machine 200.

Then, at step 413, the session monitoring service 140 can update the predicted user sessions 138 based on the updated session history 134. For example, the session monitoring service 140 may calculate the predicted user sessions 138 at a given future time or period of time based on a historical average of the current user sessions 136 at that time or period of time. Accordingly, the session monitoring service 140 may update the predicted user sessions 138 to reflect changes in the historical average. Other approaches may also be use as appropriate.

Although the session monitoring service 140 and the resource management service 142 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   a computing device comprising a processor and a memory; and
   machine readable instructions stored in the memory that, when executed by the processor, cause the computing device to at least:
   receive a message comprising a current number of user sessions being processed by a virtual machine hosted by the computing device;
   update a session history associated with the virtual machine to reflect the current number of user sessions;
   update a predicted number of user sessions based at least in part on the session history; and
   send the predicted number of user sessions to a resource management service managing the virtual machine.

2. The system of claim 1, wherein the machine readable instructions, when executed, further cause the computing device to at least:
   determine a current state for each of the user sessions being processed by the virtual machine; and
   save the current state for each of the user sessions to a guest record representing the virtual machine.

3. The system of claim 1, wherein the machine readable instructions that cause the computing device to update the predicted number of user sessions based at least in part on the session history further cause the computing device to at least calculate an average number of user sessions based at least in part on the session history.

4. The system of claim 1, wherein the message further comprises an amount of resources consumed by each of the user sessions.

5. The system of claim 4, wherein the amount of resources consumed by each of the user sessions comprises an amount of network bandwidth consumed by each of the user sessions.

6. The system of claim 4, wherein the amount of resources consumed by each of the user sessions comprises an amount of processor resources consumed by each of the user sessions.

7. The system of claim 4, wherein the amount of resources consumed by each of the user sessions comprises an amount of memory consumed by each of the user sessions.

8. A method, comprising:
receiving a message comprising a current number of user sessions being processed by a virtual machine hosted by the computing device;
updating a session history associated with the virtual machine to reflect the current number of user sessions;
updating a predicted number of user sessions based at least in part on the session history; and
sending the predicted number of user sessions to a resource management service managing the virtual machine.

9. The method of claim 8, further comprising:
determining a current state for each of the user sessions being processed by the virtual machine; and
saving the current state for each of the user sessions to a guest record representing the virtual machine.

10. The method of claim 8, wherein updating the predicted number of user sessions based at least in part on the session history further comprises calculating an average number of user sessions based at least in part on the session history.

11. The method of claim 8, wherein the message further comprises an amount of resources consumed by each of the user sessions.

12. The method of claim 11, wherein the amount of resources consumed by each of the user sessions comprises an amount of network bandwidth consumed by each of the user sessions.

13. The method of claim 11, wherein the amount of resources consumed by each of the user sessions comprises an amount of processor resources consumed by each of the user sessions.

14. The method of claim 11, wherein the amount of resources consumed by each of the user sessions comprises an amount of memory consumed by each of the user sessions.

15. A non-transitory computer-readable medium comprising machine readable instructions stored in the memory that, when executed by a processor, cause a computing device to at least:
receive a message comprising a current number of user sessions being processed by a virtual machine hosted by the computing device;
update a session history associated with the virtual machine to reflect the current number of user sessions;
update a predicted number of user sessions based at least in part on the session history; and
send the predicted number of user sessions to a resource management service managing the virtual machine.

16. The non-transitory computer-readable medium of claim 15, wherein the machine readable instructions, when executed, further cause the computing device to at least:
determine a current state for each of the user sessions being processed by the virtual machine; and
save the current state for each of the user sessions to a guest record representing the virtual machine.

17. The non-transitory computer-readable medium of claim 15, wherein the machine readable instructions that cause the computing device to update the predicted number of user sessions based at least in part on the session history further cause the computing device to at least calculate an average number of user sessions based at least in part on the session history.

18. The non-transitory computer-readable medium of claim 15, wherein the message further comprises an amount of resources consumed by each of the user sessions.

19. The non-transitory computer-readable medium of claim 18, wherein the amount of resources consumed by each of the user sessions comprises an amount of processor resources consumed by each of the user sessions.

20. The non-transitory computer-readable medium of claim 18, wherein the amount of resources consumed by each of the user sessions comprises an amount of memory consumed by each of the user sessions.

* * * * *